Jan. 15, 1935.  A. O. LONG  1,988,322
METHOD OF AND APPARATUS FOR DELIVERING FLAT WORK TO AN IRONER
Filed Jan. 18, 1933    6 Sheets-Sheet 1

Fig. 1.

INVENTOR
Archie O. Long
BY
ATTORNEY

Jan. 15, 1935.  A. O. LONG  1,988,322
METHOD OF AND APPARATUS FOR DELIVERING FLAT WORK TO AN IRONER
Filed Jan. 18, 1933  6 Sheets-Sheet 2

INVENTOR
Archie O. Long.
BY
ATTORNEY

Jan. 15, 1935.  A. O. LONG  1,988,322

METHOD OF AND APPARATUS FOR DELIVERING FLAT WORK TO AN IRONER

Filed Jan. 18, 1933   6 Sheets-Sheet 3

INVENTOR.
Archie O. Long
BY 
ATTORNEY.

INVENTOR.
Archie O. Long
BY
ATTORNEY.

INVENTOR.
Archie O. Long
BY
ATTORNEY.

Jan. 15, 1935.  A. O. LONG  1,988,322
METHOD OF AND APPARATUS FOR DELIVERING FLAT WORK TO AN IRONER
Filed Jan. 18, 1933   6 Sheets-Sheet 6

INVENTOR.
Archie O. Long.
BY
ATTORNEY.

Patented Jan. 15, 1935

1,988,322

UNITED STATES PATENT OFFICE 1,988,322

METHOD OF AND APPARATUS FOR DELIVERING FLAT WORK TO AN IRONER

Archie O. Long, Kansas City, Mo.

Application January 18, 1933, Serial No. 652,405

9 Claims. (Cl. 271—18)

This invention relates to a method of and apparatus for delivering flat work to an ironer, and has for its principal object to effect automatic feed of flat work to an ironer whereby the ironer may be operated at its full working capacity.

In carrying out my invention, I have provided for automatically folding and stacking the wet flat work and provide for automatically feeding the flat work in orderly and close formation across the width of the machine so that it may be operated at its full capacity during the time it is in operation.

In accomplishing this and other objects of the invention, I have provided improved details of structure, the preferred form of which is illustrated in the accompanying drawings, wherein.

Referring more in detail to the drawings:

1 designates a folding machine including a flat, substantially rectangular-shaped table 2 supported adjacent its corners by legs 3, 4, 5 and 6, at a height convenient to a worker standing alongside the machine so that the operator can shake out the wet pieces of flat work and spread them over the top of the table to be folded, as later described.

Formed in the top of the table and extending in parallel relation thereacross are grooved recesses 8 and 9, in which are normally positioned rods 10 and 11 constituting folding arms for effecting folding of the flat work.

The rods 10 and 11 are carried at their ends by vertically arranged arms 12 and 13 pivoted at their lower ends on a shaft 14 having its ends mounted in bearings 15 fixed to a base plate or floor 16 on which the table is supported.

Fixed to the ends of the arms are upwardly and outwardly extending cam arms 17 and 18 arranged to ride upon the peripheries of eccentrically mounted circular disk-shaped cams 19 and 20, respectively. The cams 19 and 20 are fixed on the outer end of a shaft 21 rotatably mounted in bearings 22 supported from the sides of the legs 3 and 4. The arm 17 engages the under side of the cam 19 and is retained in engagement therewith by a spring 23 having one end fixed to the base 16 and its opposite end fixed to the arm 12, while the cam arm 18 rides on the upper periphery of the cam 20 and is retained in contact by a spring 24 having one end fixed to the base and its opposite end fixed to the cam arm. When the arms are riding on the low portions of the cams, the rods are normally seated in their respective grooves, but when the cam arms are engaged by the high lobe portions of the cams the rods are swung in an arc over the table to effect folds in the flat work, as later described.

The shaft 21 is operated by a spiral gear 25 fixed thereon and meshing with a spiral gear 26 on a counter shaft 27 extending at right angles to the shaft 21 and which is rotatably mounted in a bearing 28 carried by the leg 3 and in a bearing 29 supported on one of a pair of intermediate legs 30 and 31. The end of the shaft adjacent the bearing 29 carries a spiral gear 32 meshing with a spiral gear 33 on a power shaft 34 rotatably mounted in bearings 35 and 36 also carried on intermediate legs 30 and 31.

Fixed on the power shaft 34 is a sprocket 37 and operating thereover is a chain 38 actuated by a sprocket 39 on a transmission gearing indicated by the housing 40 which is driven by the motor 41, the motor and transmission being located in convenient position on the base 16.

Figure 7:
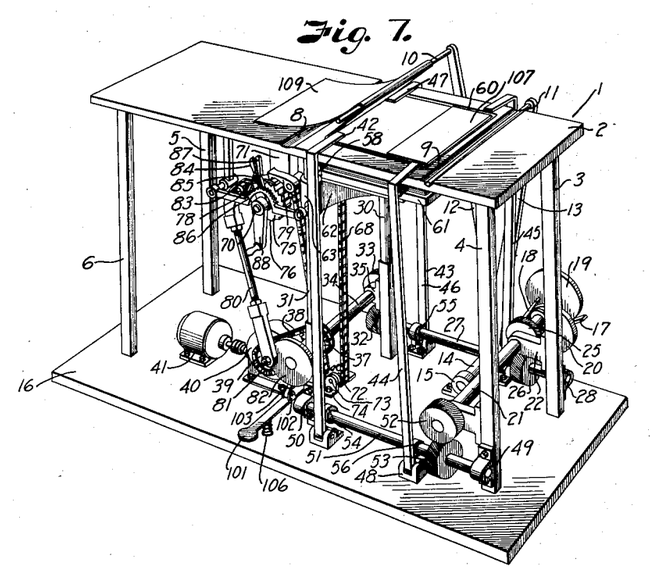
Fig. 7 is a detail perspective view of the folder for folding the flat work preparatory to delivery to the ironer.

In order to hold the sides of the flat work as they are being folded and to engage the place at which the folds are made in the flat work, I provide pivoted fingers 42, 43, 44 and 45, each comprising vertically arranged bars 46 having laterally bent ends 47 extending over the top of the table adjacent the grooves 8 and 9, as best illustrated in Fig. 7. The lower ends of the bars 46 are pivotally mounted to brackets 48 carried on the base 16.

Rotatably mounted in bearings 49 and 50, complementary to the bearings 28 and 29 at the opposite side of the platform 16, is a shaft 51 driven from the shaft 19 through intermeshing spiral gears 52 and 53 on the respective shafts.

Fixed to the shafts 27 and 51 adjacent each of the fingers 42, 43, 44 and 45 are cams 54, 55, 56 and 57 arranged to move the fingers to and from engagement with the top of the table.

The cams 54 and 55 are arranged relatively to the cams 56 and 57 so that when the fingers 42 and 43 are in engagement with the table the fingers 44 and 45 are out of position for a purpose as later described. The fingers are retained in engagement with their cams by springs 58 having one of their ends fixed to the fingers and their opposite ends fixed to angle bars 59 extending longitudinally along the side edges of the table. In order to stack the pieces of flat work as they are folded, I provide for lowering them successively through the table by means of a movable shelf as now to be described.

Formed in the table between the grooves 8 and 9 is a rectangular-shaped opening 60 having slightly larger dimensions than the flat pieces after they are folded so that they may be moved therethrough on the movable shelf or support 61 which is operable below the opening 60. The support 61 is carried on bracket arms 62 projecting from collars 63 that are slidable on the intermediate legs 30 and 31 previously described.

Figure 11:
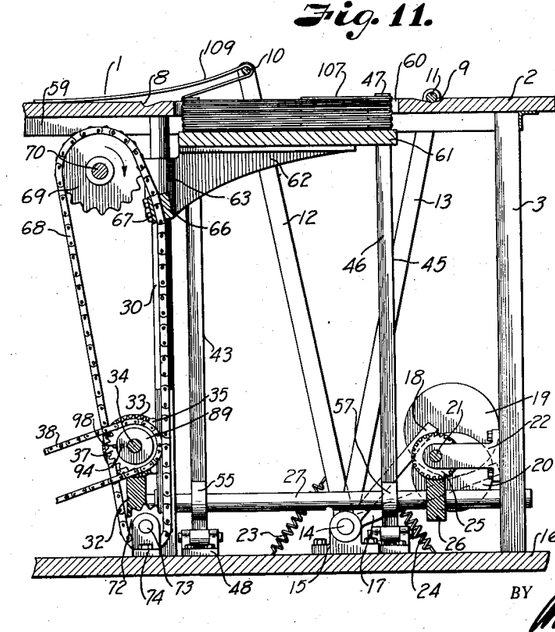
Fig. 11 is an enlarged longitudinal sectional view through the machine, particularly illustrating the table for lowering the pieces of flat work as they are folded.

The sleeve portions 63 of the brackets are interconnected by a cross bar 66 and clamped to the cross bar by a plate 67 is an endless chain 68 operating over a sprocket 69 carried on a shaft 70 supported in bearings 71 depending from the under side of the table 1 and over a sprocket 72 rotatably mounted on a pin 73 carried between brackets 74 fixed to the base 16, as best illustrated in Figs. 7 and 11.

It is thus apparent that when the sprocket 69 is rotated in a clockwise direction, Fig. 11, the support 61 is lowered from the opening in the table 1.

In order to lower the table by a series of steps, I provide a ratchet mechanism operated from the power shaft 34 so that upon each rotation of the power shaft the table will be lowered one space, as now to be described.

Figure 10:
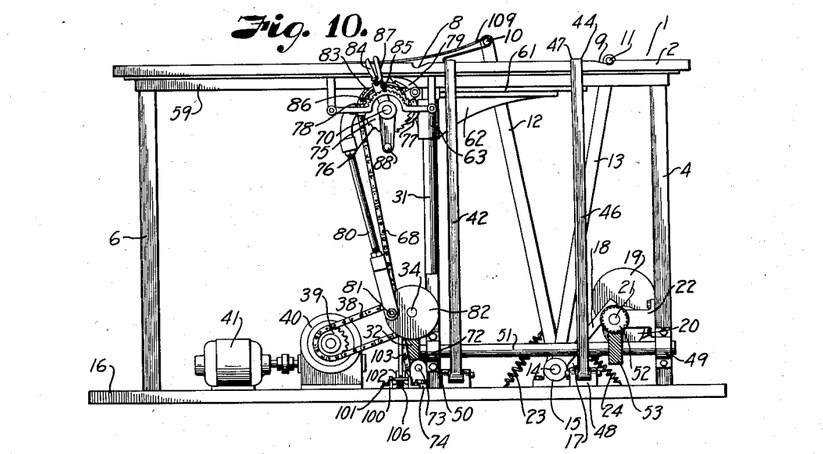
Fig. 10 is a side elevational view of the folding machine illustrated in Fig. 7.
Figure 12:
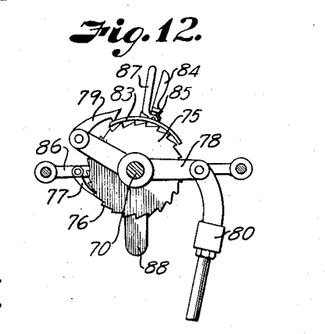
Fig. 12 is a detail view of the ratchet mechanism for controlling movement of the table.

Fixed on the shaft 70 is a ratchet wheel 75, as best illustrated in Figs. 10 and 12, having teeth 76 adapted to be engaged by a pawl 77 to prevent rotative movement thereof in a clockwise direction, Fig. 12. In order to move the ratchet wheel in a step by step movement in an anti-clockwise direction, Fig. 12, to effect step by step lowering of the support 61, I provide a rocker arm 78 pivotally mounted on the shaft 70 and having one end projecting beyond the periphery of the ratchet wheel to carry a ratchet pawl 79 adapted to engage the ratchet teeth and having its opposite end connected with a reciprocating rod 80 so that when the rod 80 is actuated the pawl 79 will be moved in an arc to engage one of the teeth of the ratchet to move the ratchet a distance proportionate to the movement of the rocker arm. The opposite end of the reciprocating rod is pivotally connected to a crank pin 81 projecting from the face of a disk 82 fixed to the outer end of the power shaft 34.

It is thus apparent that upon each revolution of the power shaft the pawl will be moved in a clockwise direction, Fig. 12, over the ratchet teeth 76 and when the rod is moved in the opposite direction the pawl will engage one of the ratchet teeth and move the ratchet wheel and the chain a distance proportionate to the throw of the crank pin on the disk 82.

In order to regulate the extent of engagement of the pawl 79 with the ratchet wheel to vary the increment of movement of the support, I provide an arcuate plate 83 arranged to extend over the periphery of the ratchet wheel to engage and raise the pawl from the teeth during a portion of its movement. The arcuate plate 83 is fixed to an adjusting lever 84 pivotally supported on the shaft 70 and which is adjustably retained in fixed position by a latching rod 85 engageable with an arcuate segment 86 supported below the under side of the table. The latching rod 85 is operated by a lever 87 pivoted to the lever 84.

It is thus apparent that when the latching rod is released from the segment, the arcuate plate 83 may be adjusted relatively to the periphery of the ratchet wheel to control the extent of engagement of the pawl 79, thus varying the distance that the support 61 moves downwardly upon each actuation of the reciprocating rod 80 under influence of the disk 82.

In order to raise the table, the end of the shaft 70 is provided with a crank 88 for rotating the ratchet wheel and shaft in an anti-clockwise direction upon lifting of the pawl 76 to return the table to position within the opening in the table.

In order to control operation of the folding rods and the fingers 42, 43, 44, and 45, the sprocket 37 is operably connected with the shaft 32 by means of a clutch arrangement now described. Keyed to the shaft 34 and abutting against the sprocket 37 is a collar 89. Slidable in a bore 90 formed in the collar from its side face adjacent the sprocket 37 is a latch member 91 having its end adapted to engage in a recess 92 in the face of the sprocket 37.

The latch member 91 has a reduced shank portion 93 slidable in a reduced portion 94 of the bore, and sleeved thereon is a coil spring 95 having one end engaging against the shoulder 96 on the latch member and against a shoulder 97 in the bottom of the bore 90 to urge the latch member in engagement with the recess in the sprocket 37. In order to release the latch member from engagement with the sprocket, it is provided with a laterally extending pin 98 slidable in a notch 99 intersecting the bore 90.

Figure 8:
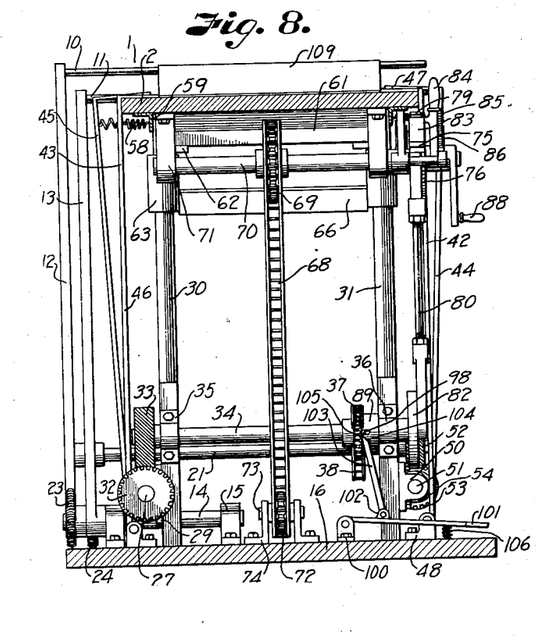
Fig. 8 is a vertical cross sectional view through the folding machine.
Figure 9:
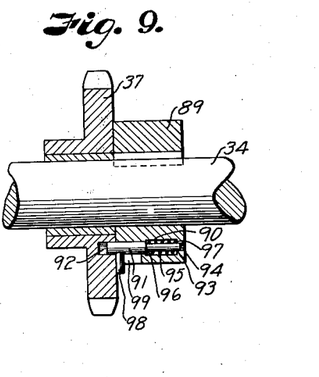
Fig. 9 is a sectional view through the drive sprocket and clutch controlling operation of the folding arms.

Pivoted to a bracket 100 fixed to the base member 16 at a point directly below the sprocket 37 is a foot lever 101 having ears 102 on its upper face for pivotally supporting a latch releasing bar 103 having its upper end arranged to ride against the face of the sprocket 37, as clearly illustrated in Fig. 8, and its upper end is bevelled, as at 104, to provide a wedge 105 to engage between the pin 98 and the face of the sprocket to hold the latch member 91 from engagement with the recess in the sprocket. In this position of the release member, the sprocket 37 rotates on the shaft 32 and the operating elements of the machine are idle.

The release member 103 is normally retained in position for engaging the pin 98 by a spring 106 which is positioned under the foot lever 101 and has its opposite end bearing against the base member 16. When the operator wishes to release the latch 91, he depresses the foot lever against the tension of the spring 106 to withdraw the member 103 from engagement with the pin. The spring 95 will then urge the latch member to enter the recess 92 when it moves into alignment therewith to connect the collar 89 with the gear 37, thereby establishing driving connection with the shaft 32 to operate the various folding arms and the lowering of the support 61, as later described.

In using this portion of the apparatus, the support is raised to close the opening in the table 1 by raising the pawl and operating the crank 88 in an anti-clockwise direction (Fig. 7). The motor 41 is then energized to operate the transmission and the sprocket 37 through the driving connection of the chain 38. The power shaft 34, of course, will remain idle because the release member 103 is holding the pin 91 out of engagement with the recess 92 in the sprocket 37. In idle position the folding rods 10 and 11 are lying in the recesses 8 and 9 and the fingers 42, 43, 44 and 45 are moved to their outer position by the cams on the shafts 27 and 51. A piece of flatwork, for example, a towel 107 is then placed over the opening in the table with one end (a) thereof lying on the edge of the support 61 adjacent the folding rod 11. The opposite end (b) of the towel is then spread smoothly on the table over the folding rod 10.

The operator then releases the latch member 91 so that it engages the recess 92 in the sprocket to connect the sprocket in driving relation with the shaft 34. Rotation of the shaft 34 rotates the shaft 27 through the spiral gears 32 and 33, which in turn operates the shaft 21 through the spiral gears 25 and 26. Rotation of the shaft 21 operates the cam disks to alternately actuate the folding rods 10 and 11. The rod 11, of course, will move idly over the end (a) of the towel lying on the support 61. Simultaneously with movement of the folding rod 11 the cams 56 and 57 allow the springs 58 to draw the fingers 44 and 45 over the end (a) of the towel to clamp it down against the support. Continued rotation of the shaft 21 moves the other cam disk in position for swinging the rod 10 from its groove across the opening in the table to carry that end (b) of the towel in overlapped relation with the portion lying on the support 61, but prior to beginning of movement of the rod 10 the fingers 42 and 43 have been moved in position to clamp the towel to the table so that a fold (c) is made in the towel along the edge of the opening adjacent the groove 8. By this time the fingers 44 and 45 have moved out of engagement with the other end of the towel so that the end (b) is spread smoothly over the folding rod 11 overlapping the end (a).

Figures 13, 14:
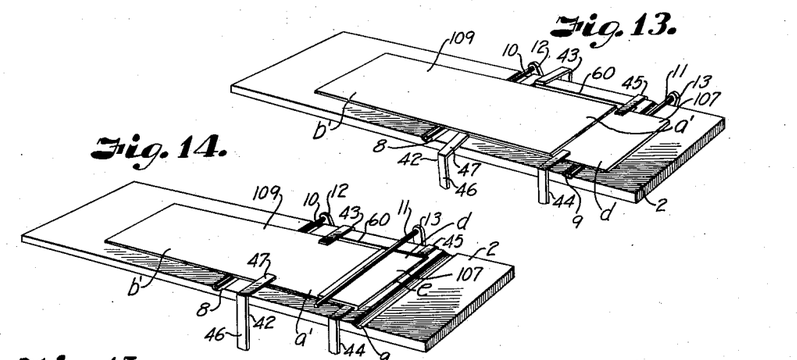
Figs. 13, 14, 15, 16 and 17 illustrate the steps of folding a piece of flat work.
Figures 15, 16:
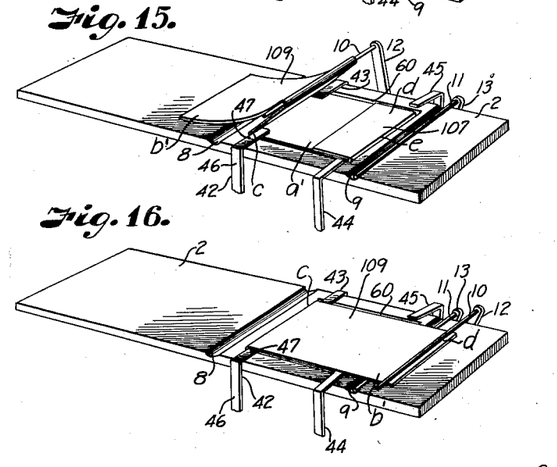
Figure 17:
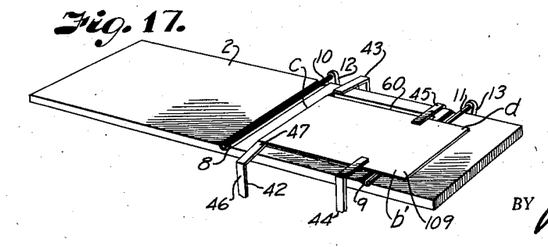

It is thus apparent that the towel now has one fold with the end (b) longer than the end (a) to provide a flap (d), as shown in Fig. 13. The folding arm 10 then moves retractively under influence of its spring to again seat in the groove 8. A second towel 109 is then placed on top of the first with one end (a') thereof in substantial alignment with the edge of the table opening adjacent the folding rod 11 and the opposite end (b') spread along the table extension, as illustrated in Fig. 13.

The fingers 44 and 45 move into position to clamp the towel for establishing a point of fold (e) for the flap (d) which is then folded over the end (a) of the second towel, as illustrated in Fig. 14, upon the next folding operation of the rod 11.

The fingers 44 and 45 are then withdrawn from clamping position and the fingers 42 and 43 are moved into position for engaging the fold (c') of the second towel. The rod 10 then moves the end (b') of the second towel over the folding rod 11 and returns to its position in the groove 8. A third towel is then placed over the table and folded the same as the second towel, and so on until a stack of flat work is supported on the table 61 which has progressively moved downwardly upon each folding operation of the arms 10 and 11. When the support has moved to its lowermost position, the stack of towels is removed and placed in a feeding mechanism to be delivered to the ironing machine, as now described.

Figure 18:
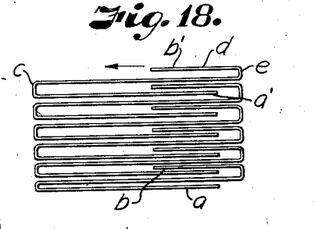
Fig. 18 is a diagrammatic view of the pieces of flat work when they are folded, the flaps and body portions of the folded pieces being separated to better illustrate the method of interlocking the folds.

By observing Fig. 18, it will be noted that each towel has two reverse folds so that the end of one towel interlocks the folded end of the other towel and when the flap (d) of the topmost towel on the stack is drawn in the direction of the arrow, Fig. 18, the fold (e) will follow the direction of the flap (d) to cause the fold (c) to unfold. Continued withdrawal causes the end (a) to drag the flap (d) on the next lowermost towel from the stack. It is thus apparent that when the topmost towel is removed from the stack, the succeeding towels follow the withdrawal of the first towel so that they may be fed into the ironing machine in consecutive order, as now described.

The ironer 110 is preferably located adjacent the folding machine and may be of conventional construction except for the feeding mechanism indicated at 111, which feeds the flat work into and through the rolls 112 of the ironer.

Extending rearwardly from the side frames 113 of the ironer are bracket extensions 114 carrying spaced table sections 115 and 116 over which overlapping conveyors 117 and 118 operate to move the towels into the ironing machine. The conveyor 117 includes a roller 119 rotatably supported by the arms 114, and operable thereover and over the forward edge of the section 115 is an endless belt 121.

The conveyor 118 includes a roller 122 spaced rearwardly from the roller 119 and an endless belt 123 operable over the roller 122 and over the forward edge of the table section 116 so that articles placed on the belt 123 will be delivered on the belt 121 and thence into the ironing machine.

The shaft of the roller 119 is provided with a sprocket 124 which is driven from a sprocket 125 fixed on an operating shaft of the ironer, and operable over the respective sprockets is a drive chain 126. Also fixed to the shaft of the roller 119 is a smaller sprocket 127 for driving a sprocket 128 on the shaft of the roller 12 by a chain 129 at a slower speed than the roller 119 for a purpose later described.

Extending along the rear side of the roller 122 is a horizontal bar 130 which cooperates with the floor 131 to support pairs of vertically spaced guide posts 132 and 133 to provide guides for stack-elevating members or carriers 134 including movable shelves or supports 135 complementary to the support 61 on the folding machine.

The supports 135 are carried by rearwardly extending brackets 136 having tubular sleeved portions 137 slidingly mounted on the guide posts 132 and 133 in the same manner as the support 61 is mounted on the guide posts of the folding machine previously described.

Figure 3:
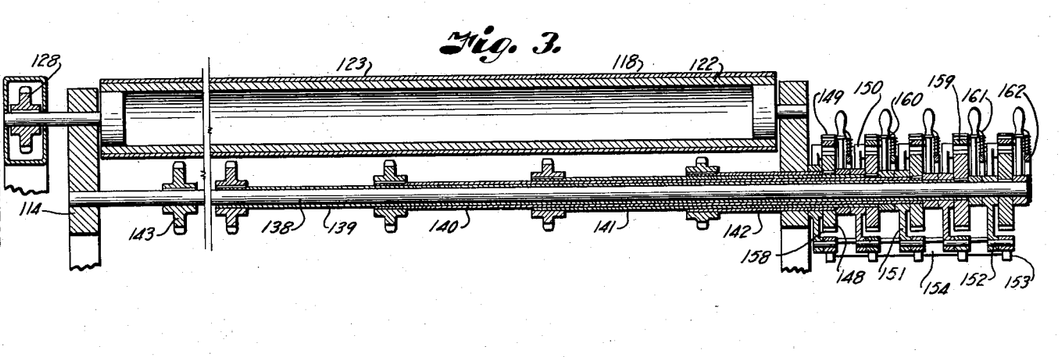
Fig. 3 is a longitudinal sectional view through the roller operating the feed belt and the telescoping shafts for operating the elevator tables for raising the stacks of flat work as the individual pieces are fed into the machine.
Figure 4:
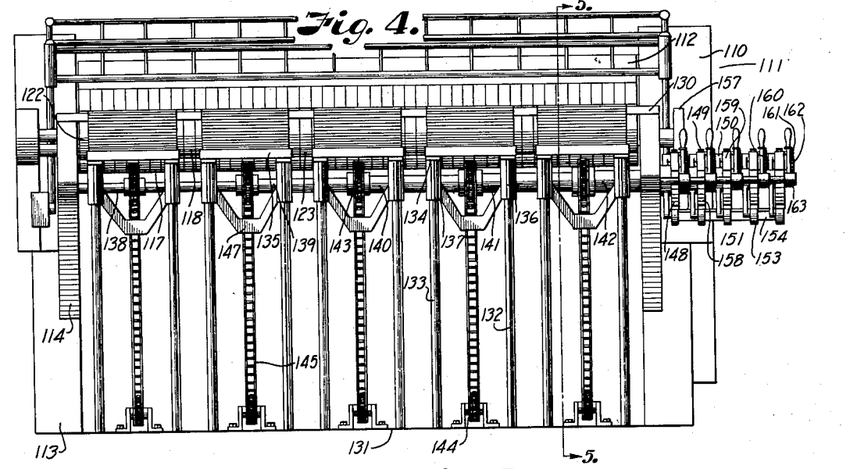
Fig. 4 is a front elevational view of the ironing machine particularly illustrating the elevating tables for raising the stacks of flat work into position for individual feed into the machine.

Rotatably mounted in the bracket members 114 at opposite sides of the ironer is a shaft 138, and operable thereon is a series of telescoping tubular shafts 139, 140, 141 and 142, which, together with the shaft 138, correspond in number to the supports, as best illustrated in Fig. 3. Fixed on the shaft 138 and to the end of each of the telescoping shafts are sprockets 143 arranged between the pairs of guide posts for each of the supports 135.

Figures 5, 6:
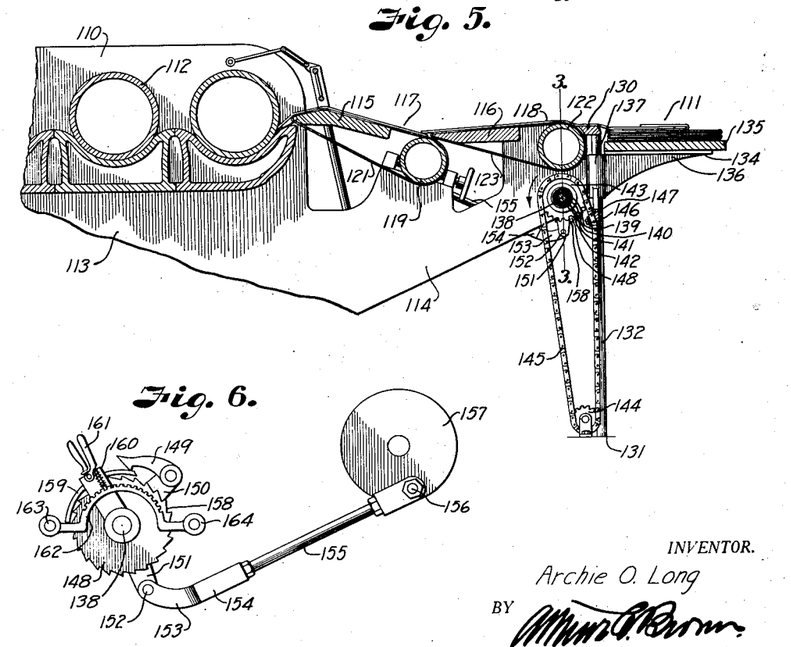
Fig. 5 is a cross sectional view through one of the elevating tables and the feed and delivery belts.
Fig. 6 is a detail view of the ratchet mechanism for progressively raising the elevating tables.

Fixed to the floor 131 at a point substantially in alignment with the sprockets 143 are sprockets 144, and operating over the respective sprockets are chains 145 having links 146 directly connected with a cross bar member 147 connecting the pairs of arms 136, as illustrated in Fig. 5. It is thus apparent that operation of the sprockets 143 in a clockwise direction, Fig. 5, will lower the supports 135 while rotation of the sprockets in the opposite direction will raise the supports 135 in a manner similar to the operation of the support 61 previously described.

In order to individually operate the shafts 138 to 143, inclusive, so that stacks of flat work of different thickness may be fed to the ironer, they are provided on their outer ends with ratchet wheels 148 adapted to be individually and intermittently rotated by pawls 149 pivotally supported on rocker arms 150 that are pivotally mounted on the respective shafts between the ratchet wheels 148.

Figure 1:
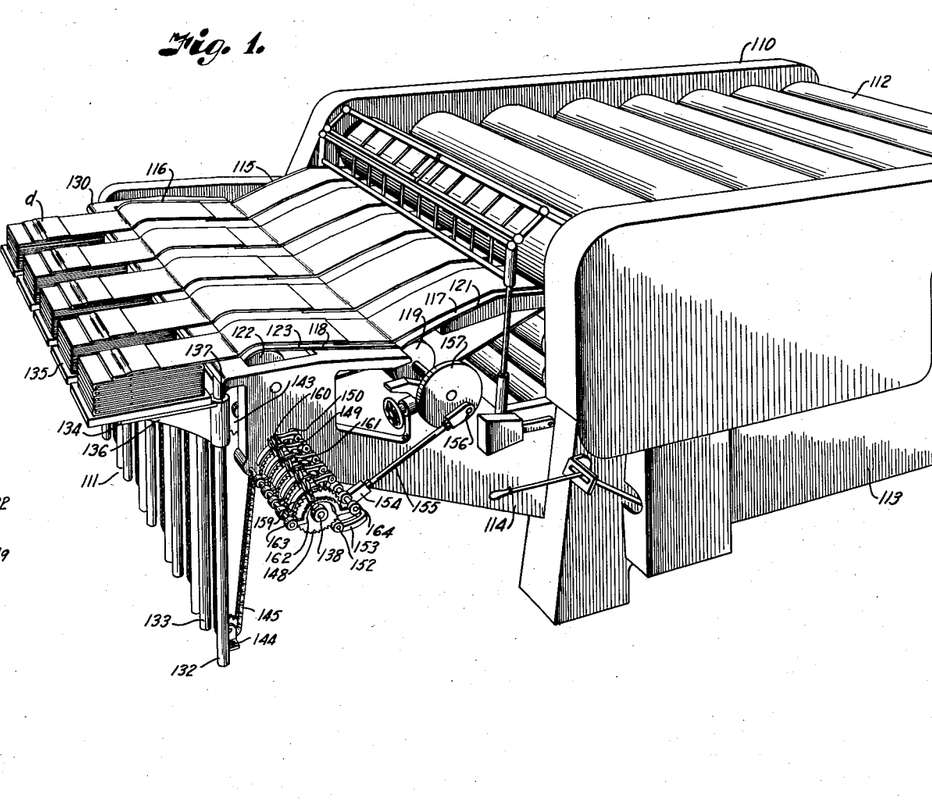
Fig. 1 is a perspective view of an ironer and associated folding and feeding machines arranged for feeding flat work in accordance with my invention.
Figure 2:
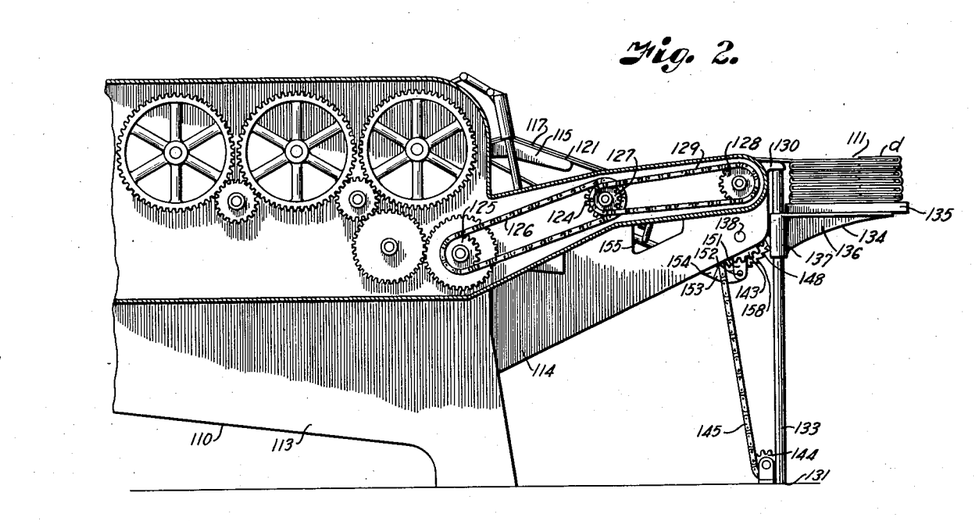
Fig. 2 is an enlarged sectional view through the front portion of the ironing machine particularly illustrating the drive mechanism for the feed and delivery belts.

The arms 150 have depending ends 151 pivotally connected by pins 152 with projecting fingers 153 on a cross bar 154. The cross bar 154 is reciprocated to rock the arms 150 by a connecting link 155 operably connected with a wrist pin 156 on an eccentric disk 157. The eccentric disk 157 is preferably mounted on an extended end of the shaft of the roller 119, as illustrated in Fig. 1.

It is thus apparent that upon each rotation of the roller shaft, the rocker arms 150 are rocked in a forward direction over the ratchet wheels and then retracted to intermittently rotate the sprockets on their retractive movements since the pawls 149 engage the teeth 158 of the sprockets.

In order to control the extent of movement of the pawls with the teeth of the sprocket to vary the degree of rotation of the respective shafts, I provide arcuate-shaped shield members 159 extending over the teeth of the ratchet wheel and carried by arms 160 pivotally supported on the shafts. The arms 160 have latch members 161 arranged to engage an arcuate segment 162 carried on spaced rods 163 and 164 at opposite sides of the ratchet wheel.

It is thus apparent that when the latch 161 is released, the arms may be swung to move the shields 159 into engagement with the pawls 149 so that the pawls will ride thereon during the movement of the arms 150, but when the shield members are moved in an anti-clockwise direction (Fig. 6), the extent of movement of the pawl 149 with the ratchet wheels may be controlled to vary the increments of movement of the respective sprockets. This is an important feature of the invention as the respective supports 135 may be moved upwardly according to the varying thicknesses of the pieces of flat work delivered to the ironer. In operating this portion of the machine all of the tables are moved to their lowermost position and stacks of flat work folded on the folding machine previously described are placed on the table so that the upper piece of flat work is in substantial alignment with the upper run of the conveyor belt 123, as illustrated in Fig. 5. The flaps (d) of the pieces of flat work are then guided into position upon the upper run of the conveyor belt and the conveyor belts are operated to draw the pieces of flat work into the machine.

As previously mentioned, the conveyor belt 121 is preferably operated at a slightly higher speed than the belt 123 so as to separate the pieces of flat work prior to their deliver to the ironer rolls, because, due to the method of interfolding the pieces of flat work, they are overlapped for a distance equal to the width of the flaps (d) and it is desirable to space pieces of flat work so that they are not overlapped when they are delivered into the ironer.

As each piece of flat work is delivered into the machine, the supports 135 are moved upwardly to bring the succeeding piece of flat work into position to follow the ones previously fed onto the belt 123. It is, therefore, apparent that the feed of the ironer is continuous and that the pieces of flat work are delivered successively in close formation to the ironer.

It is also apparent that the entire width of the ironer may be utilized for ironing flat work as practically no space is required between the supports 135.

From the foregoing, it is apparent that I have provided a method and apparatus for feeding flat work to an ironer by which the ironer may be maintained at its maximum efficiency during its entire period of operation, and that the employees who are usually required to feed the ironer are now employed in operating the folding machine. It is also apparent that a sufficient number of folding machines may be operated to keep the ironing machine at its maximum efficiency while it is in operation.

What I claim and desire to secure by Letters Patent is:

1. The method of feeding flat work into an ironer including folding pieces of flat work with the ends of adjacent pieces in overlapping relation, effecting feed of the pieces of flat work in consecutive order, and separating the overlapped pieces of flat work for individual passage through the ironer.

2. The method of feeding flat work into an ironer including folding the pieces of flat work with the ends of adjacent pieces in interlapped relation, and guiding one of the pieces of flat work into the ironer to effect feed of the remaining pieces by adherence of said end of one piece to the end of the other in consecutive order.

3. The method of feeding flat work into an ironer including reversely folding the pieces of flat work with the ends of adjacent pieces in interlapped relation, and guiding one of the pieces of flat work to the ironer to effect feed of the remaining pieces by adherence of said end of one piece to the end of the other in consecutive order.

4. The method of feeding flat work to an ironer including reversely folding pieces of flat work with the ends of adjacent pieces in interlapped relation, guiding one of the pieces of flat work to the ironer for effecting feed of the remaining pieces in consecutive order, and separating the pieces for individual feed into the ironer.

5. The method of feeding flat work into an ironer including folding the pieces of flat work with the ends of adjacent pieces in overlapping relation, stacking the folded pieces of flat work, supporting the stack in feeding relation with the ironer, guiding the topmost piece of flat work into the ironer, effecting consecutive withdrawal of the remaining pieces of flat work into the ironer, and raising the stack into feeding relation with the ironer as the pieces are removed from the stack.

6. The method of feeding flat work into an ironer including spreading a piece of flat work over a flat surface, folding one end of the piece of flat work over the other to form an extended flap, placing a second piece of flat work over the first with one end of the second piece aligning with the underlying fold of the first piece of flat work, folding the flap over the adjacent end of the second piece of flat work, folding the opposite end of the second piece of flat work over said flap so that the end thereof lies in the position formerly occupied by said flap, similarly folding succeeding pieces of flat work to form a stack, supporting the stack in feeding relation with an ironer, guiding the flap of the upper piece of flat work into feeding relation with the ironer, and effecting withdrawal of the succeeding pieces of flat work from the stack incidental to withdrawal of said upper piece of flat work.

7. The method of feeding flat work into an ironer including spreading a piece of flat work over a flat surface, folding one end of the piece of flat work over the other to form an extended flap, placing a second piece of flat work over the first with one end of the second piece aligning with the underlying fold of the first piece of flat work, folding the flap over the adjacent end of the second piece of flat work, folding the opposite end of the second piece of flat work over said flap so that the end thereof lies in the position formerly occupied by said flap, similarly folding succeeding pieces of flat work to form a stack, supporting the stack in feeding relation with an ironer, guiding the flap of the upper piece of flat work into feeding relation with the ironer, effecting withdrawal of the succeeding pieces of flat work from the stack incidental to withdrawal of said upper piece of flat work, and separating the pieces of flat work after their withdrawal from the stack.

8. An apparatus for feeding flat work into an ironer including means for supporting a stack of flat work in feeding relation with an ironer, a conveyor adjacent the stack for moving the uppermost piece of flat work and a second conveyor arranged to receive the flat work from the first conveyor, operating means for the second conveyor, and means for driving the first named conveyor from the second at a slower speed.

9. In combination with an ironer, a carrier for supporting individual pieces of flat work in stacked relation and having interengaging ends, means for withdrawing said pieces of flat work from the stack in continuous overlapped relation incidental to adherence of one piece of flat work with the overlapped portion of another, and means cooperating with said withdrawing means for effecting separation of said pieces from each other for individual feed into the ironer.

ARCHIE O. LONG.